United States Patent [19]

Barnes

[11] 4,241,130
[45] Dec. 23, 1980

[54] ABRASION AND CRACK RESISTANT PACKAGE LAMINATE

[75] Inventor: Donald E. Barnes, Minnetonka, Minn.

[73] Assignee: Champion International Corporation, Stamford, Conn.

[21] Appl. No.: 901,438

[22] Filed: May 1, 1978

[51] Int. Cl.³ .................... B32B 15/08; B32B 27/08; B32B 27/32; B32B 27/34
[52] U.S. Cl. ........................... 428/216; 426/126; 428/336; 428/339; 428/461; 428/475.8; 428/476.1; 428/523
[58] Field of Search ............. 428/216, 516, 461, 910, 428/474, 474.4, 475.8, 523, 476.1, 336, 339; 426/126

[56] References Cited

U.S. PATENT DOCUMENTS

| | | | |
|---|---|---|---|
| 3,840,427 | 10/1974 | Brazier et al. | 428/474 |
| 3,843,479 | 10/1974 | Matsunami et al. | 428/474 |
| 3,908,070 | 9/1975 | Marzolf | 428/516 |
| 3,972,467 | 8/1976 | Whillock | 428/458 |
| 4,015,049 | 3/1977 | Yoda et al. | 428/461 |

*Primary Examiner*—James C. Cannon
*Attorney, Agent, or Firm*—Evelyn M. Sommer

[57] ABSTRACT

A package laminate is described which is abrasion and crack resistant and particularly suitable for use in wrapping food products. The package laminate is formed with a biaxially oriented nylon film bonded to one side of an inner located metallic foil with an intermediate bonding layer. A smooth abrasion resistant and moisture impermeable layer in the form of a triextrusion product is bonded to the other side of the metallic foil with an intermediate bonding layer. The completed package laminate is characterized by its resistance to cracking from repeated flexure while enabling a straight, predetermined directional tear without a jagged edge.

10 Claims, 1 Drawing Figure

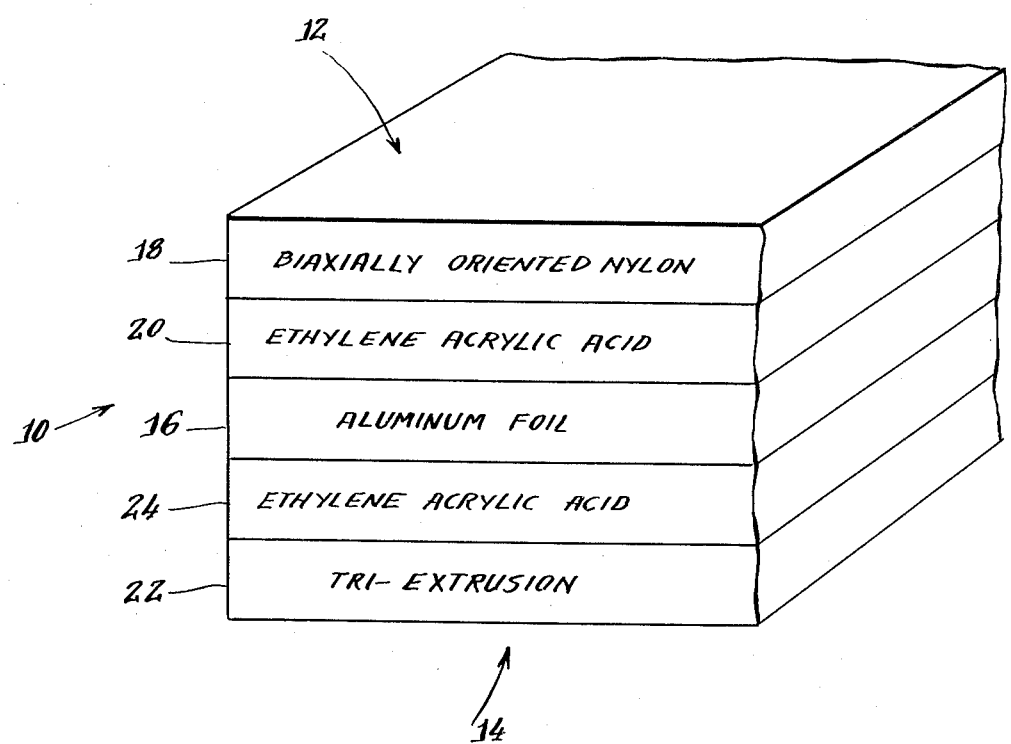

ABRASION AND CRACK RESISTANT PACKAGE LAMINATE

FIELD OF THE INVENTION

This invention relates to a package laminate. More specifically this invention relates to a package laminate suitable for use as a wrap for food products such as potato chips, cookies and the like.

BACKGROUND OF THE INVENTION

Package laminates have been extensively described in the art, see, for example, the patent to Whillock et al. U.S. Pat. No. 3,972,467. In this patent, a thermoplastic material is located on the outside followed by a paperboard layer and an intermediate nylon film which is bonded through an adhesive such as polyethylene to an aluminum foil. A thermoplastic material layer such as polyethylene, polypropylene, ethylene acrylic acid or Surlyn is located on the inside.

A package laminate such as described by Whillock et al. is suitable for bulk packaging, but does not have the flexibility to form a wrap for food products such as potato chips and cookies.

SUMMARY OF THE INVENTION

In the package laminate in accordance with the invention, a flexible food wrap is formed of a thin foil structure. The foil structure is formed of an external flex crack resistant material bonded to a metallic foil. A smooth abrasion resistant and moisture impermeable layer is bonded to the other side of the metallic foil and serves as an innermost layer or product side layer.

In accordance with a preferred form of a package laminate in accordance with the invention, the flex crack resistant material is formed of a biaxially oriented nylon film. This permits a predictable directional tear without a jagged edge. The nylon layer imparts enhanced resistance to laminate cracking which results from repeated flexure.

As further described with respect to the preferred embodiment, the metal foil is provided on an internal side with a triextrusion product which forms an abrasion resistant smooth and moisture impermeable layer to be adjacent the product or food contents.

It is, therefore, an object of the invention to provide a flex crack resistant package laminate which has a smooth internal surface layer characterized by its excellent moisture impermeability.

BRIEF DESCRIPTION OF THE FIGURE

These and other objects of the invention can be understood from the following description of a preferred embodiment described in conjunction with the drawing.

The FIGURE is an enlarged perspective view of a portion of a package laminate in accordance with the invention.

DETAILED DESCRIPTION OF EMBODIMENT

With reference to the FIGURE, a package laminate 10 is shown having an intended external side 12 and an internal side 14. The laminate 10 is formed with an internally located metallic foil 16 such as formed of aluminum or alloy thereof.

The metal foil 16 is provided on one side with a layer of flexure crack resistant material layer 18. A preferred material for this layer 18 is biaxially oriented nylon film having a specific directional tear characteristic while imparting a resistance to cracking of the laminate even in the presence of its repeated flexure.

The biaxially oriented nylon film 18 is bonded to the metal foil 16 with an intermediate layer 20. One preferred material for layer 20 is ethylene acrylic acid which can be bonded to the metal foil 16 and the biaxially oriented nylon 18.

On the other side of the metal foil 16 is an abrasion resistant material 22 having a smooth surface and which is moisture impermeable. Preferably such layer 22 is formed of a triextrusion product having these desired characteristics. The triextrusion product is formed by triextrusion of copolymer polypropylene, copolymer polypropylene and copolymer polypropylene such as is manufactured by Crown Zellerbach as CZ-320. These can be used to equal advantage the polyethylene modified polybutylene product manufactured by Du Pont i.e., Du Pont Sclair and the modified polypropylene product AT71 manufactured by Crown Zellerbach.

The triextrusion product layer 22 is bonded to the metal layer 16 with an intermediate bonding material 24, which like layer 20 preferably is formed of ethylene acrylic acid.

EXAMPLE

A package laminate in accordance with the invention was formed with the following bonded layers in the order as indicated (outside-in):

a biaxially oriented nylon layer 18 of a thickness of about 0.0005 inches, a layer 20 of ethylene acrylic acid of a thickness of about 0.0005 inches, an aluminum alloy foil 16 of a thickness of about 0.00035 inches, an ethylene acrylic acid layer 24 of a thickness of about 0.0005 inches, a triextrusion product 22 of a thickness of about 0.00125 inches as made by the Crown Zellerbach Corporation under the product number designation CZ-320.

The completed package laminate had excellent crack resistance under repeated flexure while allowing a straight across tear without a jagged edge.

What is claimed is:

1. A package laminate consisting essentially of
    a metallic foil;
    an intermediate bonding layer bonded to each opposite side of the metal foil;
    a flexure crack resistant biaxially oriented nylon film having a predetermined directional tear characteristic bonded to the metallic foil through one of said intermediate bonding layers; and
    a smooth surfaced abrasion resistant, moisture impermeable triextrusion product bonded to the metallic foil through the other of said intermediate bonding layer wherein said triextrusion product comprises three copolymer polypropylene layers.

2. The package laminate as claimed in claim 1 wherein the biaxially oriented nylon film has a thickness of about 0.0005 inches.

3. The package laminate as claimed in claim 2 wherein the smooth surfaced abrasion resistant moisture impermeable layer is formed of a triextrusion product having a thickness of the order of about 0.00125 inches.

4. The package laminate as claimed in claim 3 wherein the intermediate bonding layers are formed of ethylene acrylic acid.

5. A package laminate consisting essentially of a metallic foil;
   an ethylene acrylic acid bonding layer bonded to each opposite side of the metal foil;
   a flexure crack resistant biaxially oriented nylon film having a predetermined directional tear characteristic bonded to the metallic foil through one of said ethylene acrylic acid bonding layers; and,
   a smooth surfaced, abrasion resistant, moisture impermeable triextrusion product bonded to the metallic foil through the other of said ethylene acrylic acid bonding layer wherein said triextrusion product comprises three copolymer polypropylene layers.

6. A package laminate according to claim 5, wherein said metallic foil is an aluminum alloy foil of a thickness of about 0.00035 inches.

7. A package laminate according to claim 5, wherein said ethylene acrylic acid bonding layers each are of a thickness of about 0.0005 inches.

8. A package laminate according to claim 5, wherein said biaxially oriented nylon film has a thickness of about 0.0005 inches.

9. A package laminate according to claim 5, wherein said triextrusion product is a triextrusion of copolymer polypropylene having a thickness of about 0.00125 inches.

10. A package laminate according to claim 5, wherein said metallic foil is an aluminum alloy foil of a thickness of about 0.00035 inches; said ethylene acrylic acid bonding layers each are of a thickness of about 0.0005 inches; said biaxially oriented nylon film has a thickness of about 0.0005 inches; and, said triextrusion product is a triextrusion of copolymer polypropylene having a thickness of about 0.00125 inches.

* * * * *